United States Patent [19]

Herrero et al.

[11] Patent Number: 5,645,109

[45] Date of Patent: Jul. 8, 1997

[54] FLEXIBLE TUBULAR PIPE COMPRISING AN INTERLOCKED ARMORING WEB AND PROCESS FOR PRODUCING IT

[75] Inventors: José Mallen Herrero, Paris; Jany Feret, Marly le Roi, both of France

[73] Assignees: Coflexip; Institut Francais du Petrole, both of France

[21] Appl. No.: 249,350

[22] Filed: May 27, 1994

Related U.S. Application Data

[63] Continuation of Ser. No. 835,978, filed as PCT/FR91/00524 Jul. 1, 1991, abandoned.

[30] Foreign Application Priority Data

Jun. 29, 1990 [FR] France .................. 90 08298

[51] Int. Cl.$^6$ ......................................... F16L 11/08
[52] U.S. Cl. ..................... 138/134; 138/130; 138/133
[58] Field of Search ........................ 138/129, 130, 138/132, 133, 134, 135, 144

[56] References Cited

U.S. PATENT DOCUMENTS

| | | | |
|---|---|---|---|
| 1,055,263 | 3/1913 | Fischer | 138/135 |
| 1,637,141 | 7/1927 | Cooper | 138/135 |
| 4,344,462 | 8/1982 | Aubert et al. | 138/135 |
| 4,403,631 | 9/1983 | Abdullaev et al. | 138/130 |
| 4,549,581 | 10/1985 | Unno et al. | 138/133 |
| 4,706,713 | 11/1987 | Sadamitsu et al. | 138/129 |
| 4,860,798 | 8/1989 | Kovacs et al. | 138/130 |
| 4,867,205 | 9/1989 | Bournazel et al. | 138/130 |
| 4,903,735 | 2/1990 | Delacour et al. | 138/133 |
| 5,024,252 | 6/1991 | Oschsner | 138/130 |
| 5,176,179 | 1/1993 | Bournazel et al. | 138/130 |
| 5,275,209 | 1/1994 | Sugier et al. | 138/135 |

FOREIGN PATENT DOCUMENTS 833492 10/1938 France ....................... 138/130

Primary Examiner—David Scherbel
Assistant Examiner—Patrick F. Brinson
Attorney, Agent, or Firm—Hoffman, Wasson & Gitler

[57] ABSTRACT

A flexible tubular pipe incorporating, from the inside outward, an inner sealing sleeve or tube, and an armoring comprising a plurality of armoring webs. The armoring includes a first armoring web on which the inner sealing sleeve or tube rests. The first armoring web includes a plurality of interlocked wires wound with an angle, (A1) that is less than 80° in relation to the axis of the flexible tubular pipe. The armoring also includes a set of armoring webs placed on the outside of the first armoring web, each having at least one armoring web and non-interlocking wires. The winding angle of the wires is complementary to the angle (A1), so that a balanced flexible tubular pipe is created.

2 Claims, 3 Drawing Sheets

FLEXIBLE TUBULAR PIPE COMPRISING AN INTERLOCKED ARMORING WEB AND PROCESS FOR PRODUCING IT

This application is a continuation of U.S. application Ser. No. 07/835,978, filed Mar. 31, 1992, now abandoned, which is a continuation of U.S. national stage PCT/FR91/00524, filed Jul. 1, 1991.

This invention relates mainly to a flexible tubular pipe comprising an interlocked armoring web and to a process for producing it.

This invention relates more particularly to flexible tubular pipes for transporting fluids under pressure, such as, in particular, hydrocarbons produced during offshore well operations.

COFLEXIP, one of the applicant companies, produces and markets these pipes in great lengths which exhibit high mechanical characteristics, particularly tensile strength, crushing strength and resistance to the internal pressure of the transported fluid and to the effects of twisting.

It is known, on the one hand, how to make flexible tubular pipes of a first type comprising essentially an inner sealing tube, an armoring for strength composed ordinarily of two crossed webs each consisting of wires placed spirally around the pipe with the same winding angle, the wires of the two webs being wound with opposite angles in relation to the axis of the pipe, and an outer sleeve.

Flexible tubular pipes of this type are made with steel armoring wires exhibiting a solid section of simple shape, for example rectangular or circular.

Typically, the wires of the two armoring webs for tensile strength are laid with a balance angle equal to 55° in relation to the axis of the pipe. Such a flexible tubular pipe is called "smooth bore." Pipes called "rough bore" further comprise an interlocked strip placed on the inside of the tube which then constitutes a sealing sleeve.

These flexible tubular pipes have a relatively low cost but exhibit the drawback of being able to bear only average pressures, ordinarily limited to 200 or 250 bars.

The limitation of the resistance to pressure comes not only from the values of stresses in the armoring wires, but also from the risk of creep of the sealing sleeve or tube through inevitable gaps of the armoring web. Actually, the wires constituting the armoring web can be poorly distributed, or they can be displaced under the effect of the deformations imposed on the flexible pipe and by cumulative effect, the lateral distance separating two adjacent wires can, locally, increase beyond the average value Of the play between wires and thus reach a relatively large value. Nevertheless, the armoring webs made in this way exhibit a satisfactory stability under moderately harsh conditions of use, when the winding angles of the various armoring webs have average values between about 15° and 70°, typically about 55°, which makes it possible to produce flexible pipes that can withstand relatively great internal pressures.

On the other hand, under the effect of a high pressure, for example greater than 250 bars, the sealing sleeve or tube might gradually penetrate this spot which can compromise the fluid tightness of the flexible tubular pipe.

The French patent published under number FR-A-2 619 193 describes a flexible tubular pipe comprising two pairs of armorings wound according to two different angles, one greater than 55°, the other less than 55°. The action of the internal pressure, depending on the geometry selected, causes a slight shortening of the flexible tubular pipe or a lack of variation of this length under the effect of the pressure. Such a flexible pipe can exhibit a very high resistance of its mechanical structure to the forces developed by the internal pressure, since it comprises four armoring webs instead of two like current flexible pipes, but the allowable inside pressure remains limited by the danger of penetration of the plastic sleeve in the separations between adjacent wires.

On the other hand, flexible tubular pipes of a second type are known that are intended to withstand high pressures greater than 200 bars, and that can exceed 1000 bars for the relatively small diameters. These flexible tubular pipes further comprise, on the outside of the sealing sleeve or tube, a compressive resistance armoring, called vault comprising one or more webs of wires wound by spiral winding at an angle near 90° in relation to the axis of the pipe. The spiral winding angle of the vault is generally greater than or equal to 85° and always exceeds 80° in relation to the axis of the flexible tubular pipe, which imparts to the vault a maximum resistance to the circumferential component (hoop-stress) of the forces produced by the internal pressure, this component being, normally, dominant in relation to the axial load when the internal pressure is very high. The resistant structure of the flexible pipe is rounded out, on the outside of the vault, by at least two armoring webs known as tensile armorings consisting of wires exhibiting a section of simple shape, rectangular or circular for example, the armoring angles of the various webs being in opposite directions and less than 55°, typically on the order of 30° to 45°. Said tensile armoring webs provide, mainly, resistance to tensile forces and to twisting forces. The resistance to the circumferential component of the forces of the internal pressure is provided, in a preponderant way, by the vault, and, secondarily, by the tensile armorings. On the other hand, because of its high spiral winding angle, the vault offers a relatively very slight resistance to tensile and twisting forces. Because of the slight axial strength of the vault, the turns of wire that constitute it can undergo considerable displacements in the length of the flexible pipe, which can cause the total disorganization of the structure and the damage of the pipe. To limit the axial displacements of the turns, so-called interlocked wires are used, the two lateral edges of a wire each exhibiting a groove limited by a rib. Thus, there are various known types of interlocked wires, each of the two lateral ribs of such a wire being engaged in the groove of an adjacent wire turn. This engaging is performed with a certain play in the direction of the width of the wire, this play determining the possible variation in length of the flexible pipe along its longitudinal axis, and being determined, for each production to be performed, so that the flexible pipe can be bent with a radius of curvature equal to a desired minimum value.

The presence of the spiraled and interlocked vault imparts to the flexible tubular pipe an excellent resistance to high pressures, particularly internal.

On the other hand, the presence of an additional layer increases the cost of the materials used to make the flexible tubular pipe. Further, the spiral winding of the vault at an angle near 90° in relation to the axis of the flexible tubular pipe is performed at a speed clearly less than the speed of laying of tensile armorings by armor winding machines. This increases the cost and the production time of the flexible tubular pipe that can withstand great internal pressures.

To obtain a balanced flexible pipe, i.e. a flexible pipe exhibiting a variation in length and amplitude twisting effects that are sufficiently slight when it is subjected to a high internal pressure, it is necessary to have a plurality of armoring webs, at least one of said armoring webs having a winding angle (in relation to the axis) less than or approximately equal to 55° and at least one other armoring web comprising a winding angle greater than or approximately equal to 55°.

It is said that the armoring webs have complementary angles to obtain a balanced flexible tubular pipe. This idea of complementary angles is thus applied, on the one hand, to the set of the armoring webs of the flexible pipes of the first type without pressure vault, for example, two crossed webs wound at 55° in opposite directions, and, on the other hand, to the set of the tensile armoring webs of the flexible pipes of the second type with pressure vault, for example: two armoring webs crossed at 30°.

On the other hand, the pressure vault of the second type plays almost no role in the balancing of the structure, because its spiral winding angle is very large. Consequently, flexible pipes of this type are made, currently, with a single web of wires constituting the vault, without the helical winding of the wires of the vault being compensated for by another web of wires wound in the opposite direction with a spiral winding angle that is equal or of close value.

A flexible tubular pipe according to this invention comprises, surrounding the inner sealing sleeve or tube, a first armoring web consisting of the helical winding of a plurality of interlocked wires laid with an angle less than 80°, for example near 55°, such that this first interlocked web participates, in combination with the other armoring web or webs, in the resistance of the flexible pipe to the axial forces, the twisting forces and the circumferential component of the forces due to the internal pressure. The second web of the armoring and of optional other webs wound for example at an angle of −55°, are made with wires of simple section, that cannot be interlocked, for example of rectangular, square, circular or elliptical section. The winding angles, respectively of the first interlocked web and, depending on the case, of the second web or of other armoring webs have complementary values so that the set of the first interlocked web and the other armoring web or webs constitutes a balanced resistant structure.

The use of interlocked wires to make the first armoring web makes it possible to assure that the play between two adjacent wires remains limited to a set and low value; consequently, the first interlocked web, in relation to the inner sealing sleeve or tube, constitutes a support surface exhibiting slight discontinuities and the flexible tubular pipe can be made to withstand extremely high internal pressures, higher than 250 bars. The first interlocked armoring web, from this viewpoint, plays the same role as the interlocked pressure vault of known flexible pipes (second type described above) while providing a part of the resistance to the tensile and twisting forces. The flexible pipe according to the invention exhibits the advantage, compared with the known flexible pipes of the first type with interlocked pressure vault, of being less costly to produce, since it does not comprise, in addition to the balanced set of armoring webs resistant to pulling and twisting, the internal web of wires spirally wound with a high angle, of 80° to near 90°. In particular, it can be made economically with the same number of webs as known flexible pipes of the first type without pressure vault, while being able to withstand higher internal pressures.

The use for the second armoring web of non-interlocked wires makes it possible to use non-interlockable wires of simple section, of a lower cost than interlockable wires and that are easier to use. Although the set of the armoring webs constituting the balanced structure which withstands the internal pressure and the forces of pulling and twisting is made, heterogeneously, with a first web of interlocked wires while the other armoring wires are not interlocked, it has actually been found that a flexible pipe according to the invention exhibits, in use, a satisfactory behavior.

The work conducted by the applicant companies has made it possible in particular to establish that the conditions under which the wires of the first web are deformed and displaced under the action of the stresses applied to the flexible pipes, in case of bending among other things, are affected by the interlocking of the wires which limits their respective lateral movements.

The wires of the first web thus having a behavior that is different from the wires of the other webs, while the latter react in the same way, already studied and known, as the ordinary armoring wires of the known flexible pipes; despite these particular properties of the first interlocked web, and although the phenomena involved are complex and although it has not yet been possible to set forth a complete theory and calculation methods comparable to the ones which have been developed to deal with the case of known non-interlocked armorings, it has nevertheless been found that the behavior of the armoring webs according to this invention is completely satisfactory, in particular for making high pressure flexible piping used in offshore oil production installations.

This invention makes it possible to increase the pressure resistance of flexible tubular pipes of simple structure having two crossed armoring webs. It makes it possible, on the other hand, to simplify the flexible tubular pipe structure making it possible to withstand high pressures.

By French patent 72 15295 published under No. FR 2 182372, it is known how to make flexible tubular pipes comprising two crossed armoring webs to withstand pulling. In a first example of embodiment described in this document, the two crossed webs are both made from an interlockable S- or Z-shaped wire. In a second variant embodiment described in this patent, the two webs are not interlocked. This document, which relates essentially to a device and a winding method using a particular process of preshaping the wire, does not speak of the use of the first interlocked armoring web to withstand at the same time the circumferential effect of the average or great pressures and the axial tensile forces in combination with at least one other armoring web exhibiting a complementary winding angle, so as to achieve a balanced structure.

On the other hand, this invention has as its object a flexible tubular pipe comprising a first armoring web intended, together with at least a second web of armoring wires, to play simultaneously the role of resistance to the circumferential effects of the internal pressure and to the tensile forces.

Various known types of wires of interlocked shape can be used to make the first interlocked web.

In a first variant embodiment of flexible tubular pipes according to this invention, the first interlocked web consists of a plurality of wires forming two complementary sets. The wires of the first set are complementary to the wires of the second set so as to be able to interlock the wires belonging to said first set with the wires belonging to said second set. The two lateral edges of each wire each exhibit a groove limited by a rib forming a lateral protuberance, the two grooves of a wire being oriented in the same direction.

The ribs and grooves of the wires of the first set face the grooves and the ribs of the wires of the second set, so that the interlocking of the web is performed by the fitting of the ribs of the wires of each of the sets into the grooves of the other set. The section of the wires can exhibit, in particular, a T shape or a U shape. Examples of such sets of wires are illustrated in FIGS. 4 and 5. Advantageously, the interlockable wires of complementary shapes are symmetrical in relation to their median plane, which makes it possible to obtain excellent results without having to perform a bending on the edge of the wires.

In a second variant embodiment, the first interlocked web consists of a single set comprising a plurality of wires all exhibiting the same interlockable section. In a way known in the art, such a web of interlocked wires can be made with S- or Z-shaped wires, the two lateral ribs of the same wire being oriented in opposite directions, so that each groove of a wire is housed in the groove facing it of the adjacent wire.

Generally, the fitting of each of the two lateral ribs of a wire in the groove of the adjacent wire facing it is done with a lateral play. In comparison with spiral wire webs with an angle greater than 80° which constitute the interlocked pressure vaults, the lateral play between two adjacent wires of the first interlocked web can exhibit a value on the same order of magnitude, or, advantageously, be lower, which has a favorable effect in regard to the danger of penetration of the sealing sleeve or tube in the gap between two adjacent wires, the width of this gap being limited by the lateral play between the wires.

In a first advantageous embodiment, the balanced resistant armoring of the flexible pipe, placed around the inner sealing sleeve or tube comprises, on the outside of the first interlocked armoring web, a single other armoring web, this second web being made with non-interlockable wires laid with a winding angle complementary to that of the first interlocked web and in the opposite direction.

Advantageously, the winding angles of the two webs are equal to or near the balance angle 55°, their values remaining preferably between 53½° and 57½°, and, advantageously, between 54½° and 56½°.

Alternately, winding angles A1 and A2 of the first interlocked web and of the second non-interlocked web are one greater than, the other less than 55°; advantageously A1 and A2 are such that tangent, tg (A1)×tangent, tg (A2) is between 1.8 and 2.3, advantageously between 1.9 and 2.2, so as to facilitate obtaining a balanced armoring structure. As a function of the equipment used to produce the flexible pipe, and, on the other hand, conditions of use in operation, angles A1 and A2 can exhibit differences that are more or less considerable relative to 55°, while remaining less than 80°.

In a second advantageous embodiment, the resistant armoring placed around the inner sealing sleeve or tube consists of two armoring pairs. The first, inside pair comprises the first interlocked armoring web laid on the inner sleeve or tube with a winding angle A, the second, non-interlocking web laid in inverted direction with the same angle A. The two non-interlocked webs constituting the second, outside armoring pair are laid with an angle B, in opposite directions in relation to one another. One of the two angles, A for example, is less than 55°, the other angle, B for example, being greater than 55°.

The invention has mainly as its object a flexible tubular pipe comprising, from the inside outward, an inner sealing sleeve or tube, an armoring composed of a plurality of armoring webs characterized by the fact that the armoring consists of:

a first armoring web on which the inner sealing sleeve or tube rests, this first armoring web consists of a plurality of interlocked wires wound with an angle A1 less than 80° in relation to the axis of the flexible tubular pipe, a set of armoring webs placed on the outside of the first armoring web comprising at least one armoring web, the wires of said group not being able to be interlocked and arranged so that all of the winding angles of said wires of said set of armoring webs are complementary to angle A1, so as to obtain a balanced flexible tubular pipe.

The invention also has as its object a flexible tubular pipe comprising a inner sealing sleeve or tube and an armoring, characterized by the fact that the armoring comprises at least a first interlocked web resting on the outer surface of the inner sealing sleeve or tube wound at an angle less than 80°, the non-interlockable armoring wires being symmetrical in relation to a median plane.

The invention also has as its object a process for producing flexible tubular pipe comprising the steps consisting in:

extrusion of a sealing sleeve or tube, putting armorings in place, characterized by the fact that the winding operation comprises the steps:

preshaping by twistings and winding with a first winding angle less than 80° of a plurality of interlockable wires constituting a first armoring web resting on the inner sealing sleeve or tube.

winding of a second armoring web consisting of a plurality of non-interlockable wires laid in a direction opposite to the first web and with a winding angle complementary to the first interlocked web.

The invention will be better understood by the description below, and by the accompanying figures, given as nonlimiting examples, of which:

In FIGS. 1 to 5, the same references have been used to designate the same elements.

Figure 1:
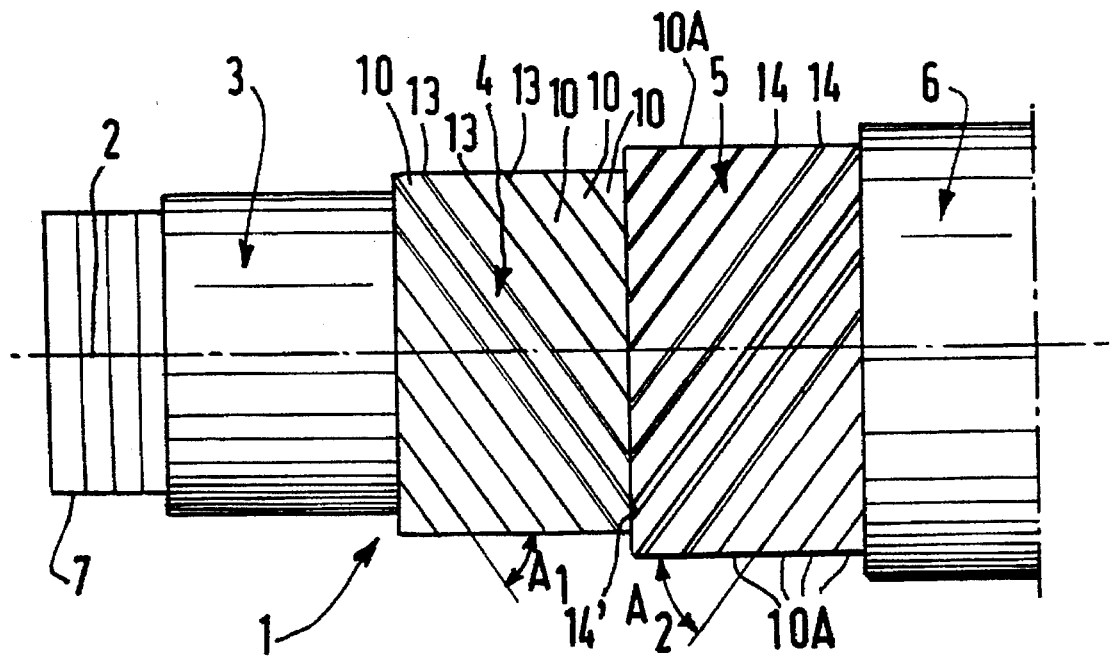
FIG. 1 is a cut-away of a first example of embodiment of flexible tubular pipes according to this invention.

In FIG. 1, a first example of embodiment of flexible tubular pipe 1, with axis 2 according to this invention can be seen.

Flexible pipe 1 comprises a sealing sleeve or tube 3 made for example by extrusion, for example of polyamide 11 or 12 or of polyethylene or of a plastic containing fluorine. In the advantageous variant embodiment, sealing sleeve 3 comprises on the inside an interlocked strip 7, the flexible tubular pipe is of the "rough bore" type. This strip notably improves the crushing strength.

Figure 4:
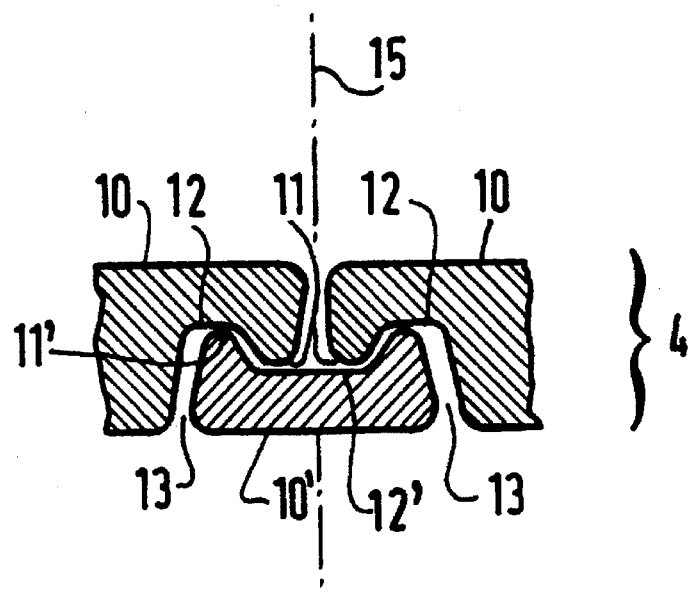
FIGS. 4 and 5 are views in section of the wires that can be interlocked on other wires having a complementary shape that can be used for the making of armoring webs of flexible tubular pipes according to this invention.

Flexible tubular pipe 1 comprises an armoring web 4 adjacent to sealing sleeve or tube 3. Armoring web 4 is for example wound at 55° in relation to the axis of flexible pipe 1. Web 4 is made with interlockable wires making it possible to limit the plays between the successive pitches of the spiral. For example, U-shaped wires illustrated in FIG. 7 or S- or Z-shaped wires, as described in patent FR-2 561 745, illustrated in FIG. 4, are used. Advantageously, a T-shaped wire as described in patent application PCT WO 91/00467 filed in the names of the applicant companies under the priority of application FR 89 08854 is used.

Armoring web 4 is surrounded by an armoring web 5 made with non-interlockable wires made up of spirals in the direction opposite the angle formed by the spirals of the wires of web 4. Web 5 is surrounded by an outside sleeve made, for example, of a plastic such as, for example, polyethylene or polyamide 11.

The maximum width of gaps 13 between wires 10 of web 4 is limited thanks to the interlocking. Thus, the possibilities of creeping of sealing sleeve or tube 3 in gaps 13 of the wires of web 4 are limited. These problems of creeping are explained, for example, in French patent 85 17497 published under No. FR-A-2 590646. The maximum width of gap 13 is governed by the width dimensions that the sections of the adjacent wires exhibit, respectively, and in particular, by the widths of the lateral parts forming grooves and ribs. The maximum value of gap 13, or lateral play between wires, is equal to the difference (b–a) between width b of the groove and width a of the rib. Considering the case of a flexible pipe in a linear state, its longitudinal axis forming a straight line, it is seen that the axial length of the flexible pipe can vary between a minimum and a maximum corresponding to the minimum and maximum values of the distance between axis 1, parallel to the axis of the flexible pipe, between adjacent turns; it is thus possible to characterize the lateral play by the ratio $$\frac{1\ maxi - 1\ mini}{1\ maxi},$$

1 maxi being the maximum value that 1 can take and 1 mini being the minimum value that 1 can take. In the case of pressure vaults of known type, made by spiral winding of an interlocked wire with a high angle, greater than 80°, said ratio, which is equal to the curvature D/2R of the flexible pipe, D being the average diameter of the vault and R the radius of bend of the flexible pipe counting from mid-thickness of the vault, and is currently equal to on the order of 15 to 20%. In the case of the first interlocked armoring webs according to the invention, this ratio can exhibit a similar value, but, advantageously, it can be lower, on the order of 10%.

Sealing sleeve or tube 3 is subjacent to armoring wire web 4 to the extent that no armoring web is interposed between web 4 and sealing sleeve or tube 3. However, an intermediate layer can exist between web 4 and sleeve or tube 3, such as for example a plastic ribbon or a layer of fabric.

Armoring web 5 comprises wires 10A exhibiting gaps 14. In the absence of interlocking, it is not possible to guarantee a width of gaps 14 of armoring web 5 that is as regular as gaps 13 of subjacent armoring web 4. This is symbolized by gap 14' which accumulates the play between armoring wires 10A of web 5. This gap, not shown in scale, if it were directly in contact with sealing sleeve or tube 3 could cause, under high pressures, a creeping of the material constituting sealing sleeve or tube 3.

Sealing sleeve or tube 3 rests on armoring web 4. The armoring web comprises a plurality of wires 10. The interlocking of the wires 10 used makes it possible to limit the maximum size of gaps 13 between wires 10 to prevent the material of sealing sleeve or tube 3 from entering the gaps. Under the effect of the stresses exerted by the internal pressure, including for pressures greater than 200 bars, currently on the order of 350 bars and that can reach or exceed 700 bars. The armoring as a whole consisting of webs 4 and 5 makes it possible for the flexible tubular pipe to withstand considerable tensile forces that can reach several hundred tons, i.e., several million Newtons, and to withstand the twisting torques. Since webs 4 and 5 are wound in opposite directions with complementary angles, the armoring as a whole thus constituted behaves like a balanced structure, in the sense that, for example, the variations in axial length of the pipe and the twisting effects are limited to relatively very low values when the flexible pipe is subjected to a high interior pressure. Since armoring web 4 provides the support of sealing sleeve or tube 3, it is possible to tolerate gaps 14 of greater size in web 5. Particularly, it is possible to tolerate gaps 14' of greater size that are distributed randomly on the surface of web 5.

The armoring wire is for example metal, for example made of steel, particularly carbon steel or stainless steel or of aluminum or aluminum alloy. In a variant embodiment, the wires that constitute web 4 and/or 5 are made of composite material comprising fibers, such as for example glass fibers or carbon fibers included in a thermosetting or thermoplastic matrix.

Angle A1 formed by the wires of web 4 and angle A2 formed by the wires of web 5, in relation to axis 2 can be equal, or approximately equal, as illustrated in FIG. 1. In this case, the value of angles A1 and A2 is, typically, about 55°. Generally, to make a balanced structure, it is possible, advantageously to determine angles A1 and A2 so that the product tangent, tg (A1)×tangent, tg (A2) is approximately equal to 2. Angles slightly different from 55° make it possible for example to use wires of standard dimension while respecting the stress of having a whole number of wires (optionally an even number in the case of wires such as drawn in FIGS. 4 and 5) distributed regularly over the flexible tubular pipe with a slight lateral play between the wires and this while respecting the value established a priori for the winding radius of the wires. For example, angles that are equal to between 53½° and 57½°, advantageously between 54½° and 56½° are used.

In addition, in the case of certain particular applications, it is possible to wind web 4 and web 5 in an opposite direction with the same angle less than 55°, or with the same angle greater than 55°, the difference relative to 55° being able to reach 2° or optionally 3° without going outside the scope of this invention.

By way of example, below are the main characteristics of a flexible tubular pipe according to the invention, of the "rough bore" type:

internal diameter 101.6 mm
internal casing of interlocked strip, of stainless steel of the type A 151 304, thickness: 4 mm
internal sealing sleeve of polyamide 11, thickness: 5 mm
first armoring web, thickness: 5.5 mm
second armoring web, thickness: 5 mm
ribbon, thickness: 0.5 mm
outside sleeve of polyamide 11, thickness: 5 mm
outside diameter 151.6 mm In the case of this flexible pipe structure defined to be compatible with a crude containing H2S which necessitates limiting the maximum stresses in the steel to a relatively low level, the maximum operating pressure is 534 bars.

The first web is made with T-shaped wires, 13.9 mm wide and 5.5 mm thick, wound at 55°. The second web is made of flat wires, of section 12 mm×5 mm, wound in the opposite direction at 57°. The wires of the two webs are made of carbon steel exhibiting a breaking point at least equal to 850 MPa.

Thanks to the interlocking of the wires that constitute the first armoring web, the maximum pressure of use is now limited only by the mechanical strength of the armorings as a whole, and not by the risk of penetration of the inner sealing sleeve between the wires of the first web. Thus, flexible pipes could be made that can bear an internal pressure reaching 700 bars, or even 1000 bars, by using metal materials of higher strength, by increasing the thickness of the wires, or by increasing the number of armoring webs.

Figure 2:
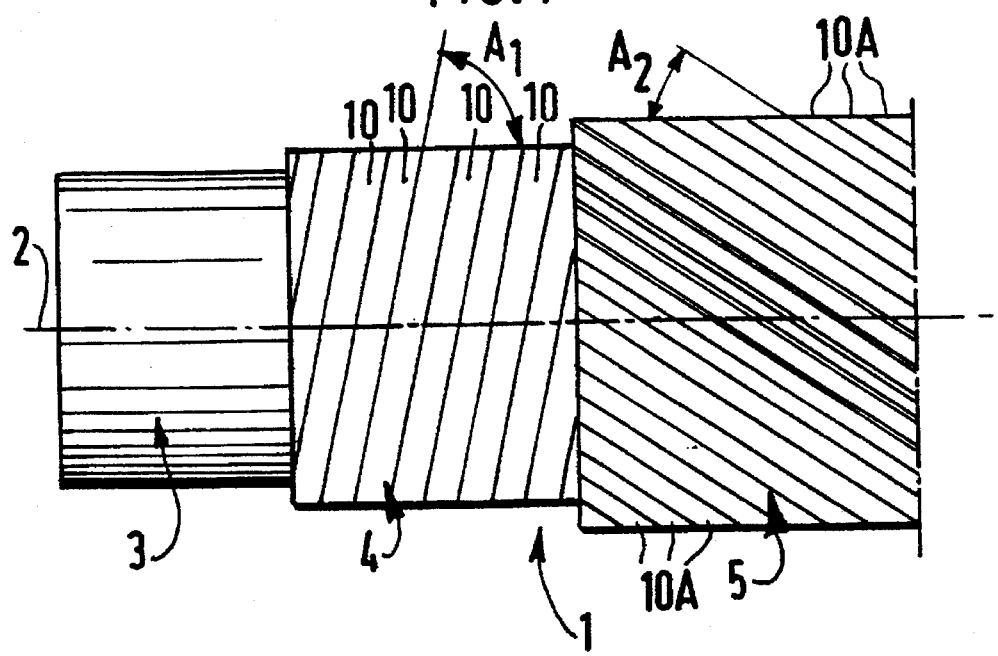
FIG. 2 is a cut-away of a second example of embodiment of flexible tubular pipes according to this invention.

FIG. 2 illustrates an example of embodiment exhibiting angles A1 and A2 that are different. It is also possible to make the first interlocked web with an angle of 75° for example, and the second web with an angle of 28° in the opposite direction.

Figure 3:
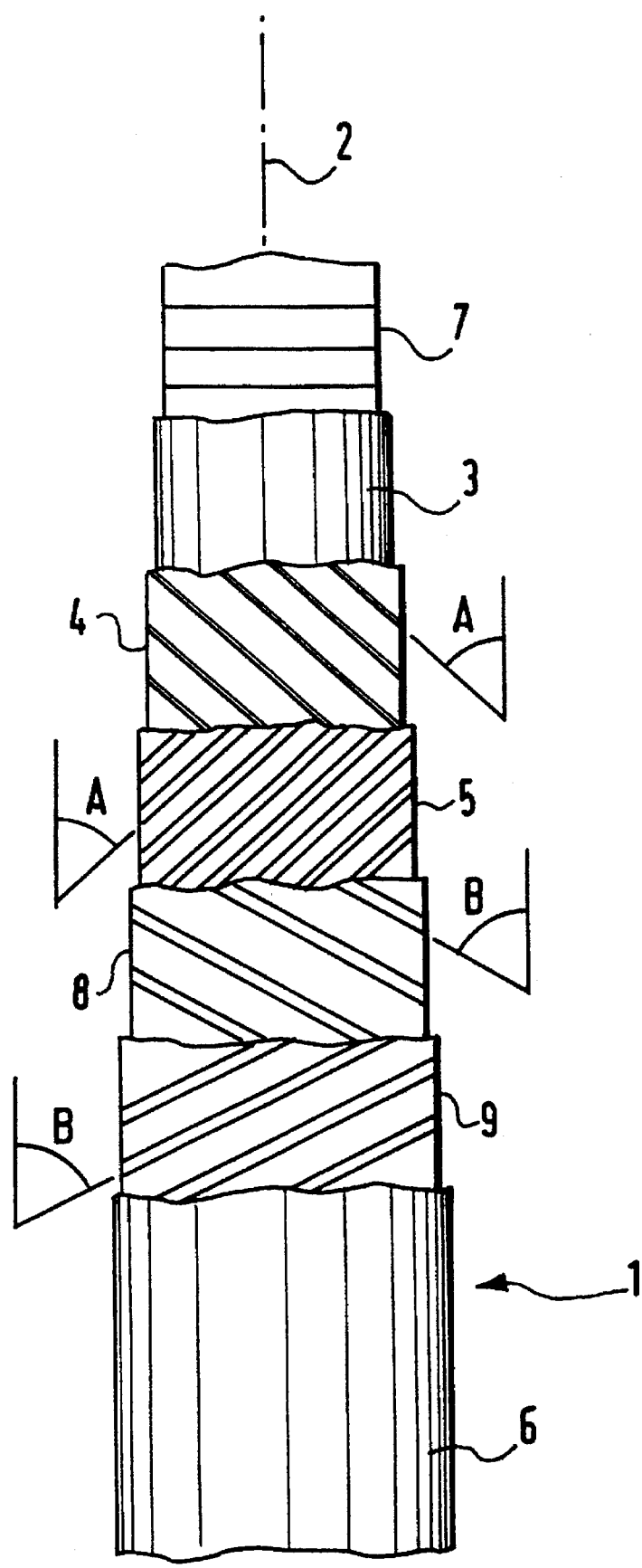
FIG. 3 is a cut-away of a third example of embodiment of a flexible tubular pipe according to this invention.

In FIG. 3, a flexible tubular pipe 1 can be seen comprising two pairs (4, 5), (8, 9) of crossed armoring webs. The first armoring pair exhibits an angle A in relation to axis 2 of flexible tubular pipe 1. The second pair (8, 9) exhibits an angle B in relation to axis 2 of flexible tubular pipe 1. One of the angles, for example A is less than 55°. The other angle, for example, B is greater than 55°. The selection of the angles, such as the selection made in patent 87 10997 published under No. 2 619 193 cited above makes it possible to obtain the balancing of flexible tubular pipe 1 while controlling its possible elongation under the effect of the internal pressure. Flexible tubular pipe 1 illustrated in FIG. 3 is of the rough bore type comprising an interlocked strip 7 inside of sealing sleeve 3. Of course, the constitution of smooth bore-type flexible tubular pipe not comprising an interlocked strip on the inside of sealing tube 3 does not go outside the scope of this invention.

In flexible tubular pipe 1 according to this invention at least armoring web 4 that is adjacent to the sealing tube or sleeve 3 is made with an interlocked wire. Thus, an excellent resistance to high internal pressures is gained while avoiding, in the case of the example illustrated in FIG. 3 an unwanted elongation of flexible tubular pipe 1 under the effect of the internal pressure.

In addition, the fact of having four armoring webs, as illustrated in FIG. 3, makes it possible to increase considerably the mechanical strength of the pipe under the effect of the internal pressure, which is all the more advantageous the larger the inner diameter of the pipe.

The S- or Z-shaped wire is not symmetrical in relation to its median plane 15. Thus, as is explained in French patent No. 7 215295 published under No. FR-A- 2 182 372, it is advantageous to have a wire not exhibiting symmetry in relation to its median plane 15 undergo a preshaping by edge bending, known as sword blade bending in a plane containing the axis of wire 10 and that is perpendicular to median plane 15. In addition a preshaping by twisting of the wire around its main axis to form a spiral is performed.

Figure 5:
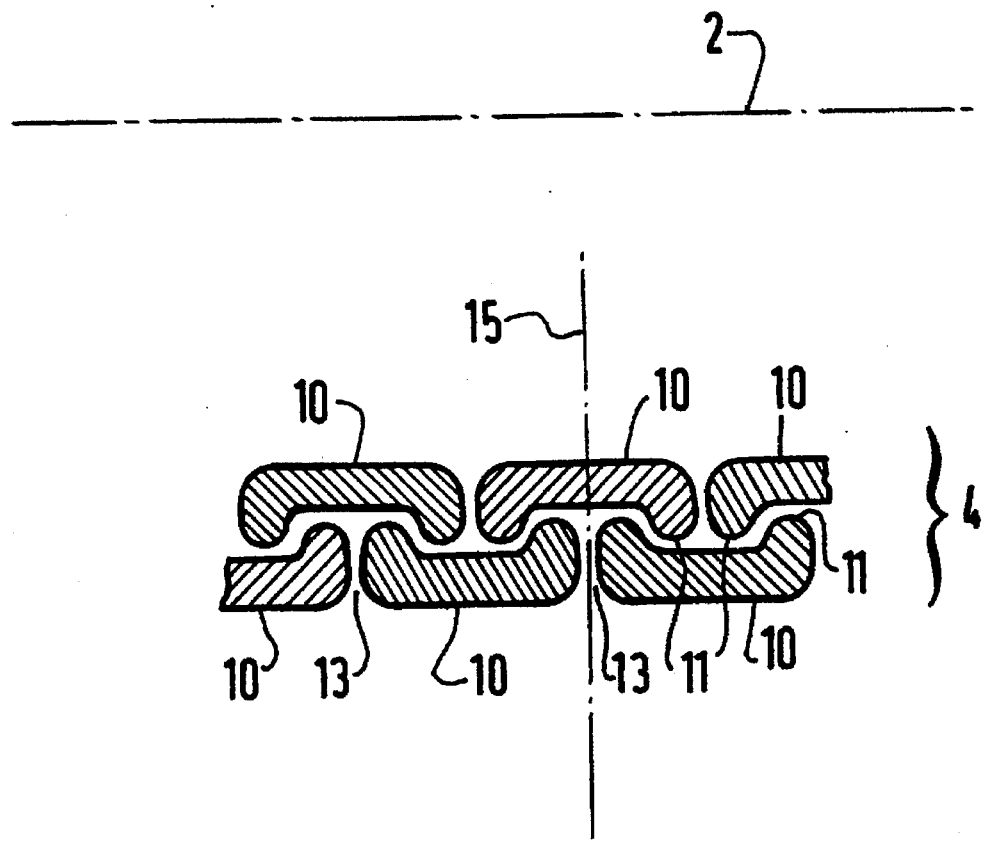

In FIGS. 4 and 5, three examples of armoring wire webs 4 can be seen composed of two sets of wires of complementary shapes, each wire belonging to a first set cooperating with two wires of the second set which frame it so as to produce the interlocking effect. In this case, it is possible, and advantageous, to make wires 10 having a symmetrical shape in relation to a median plane 15. In this case, it is no longer necessary to perform the preshaping by edge bending, which simplifies the production process. In this case, it is enough to perform a preshaping by twisting of the wire around its main axis to form a spiral.

The example of embodiment of web 4 comprises spiral windings of S- or Z-shaped wires 10 that can be interlocked. Each wire 10, at each of its ends intended to be interlocked with the adjacent wires, comprises a groove 12 constituting a channel of width b followed by a protuberance or projection 11 constituting a rib of width a. During the winding of armoring web 4, it is made certain to have projections 11 enter grooves 12 of the adjacent wires.

Once the flexible tubular pipe is made, when adjacent wires 10 try to separate, for example because of the bend of the flexible pipe or under the action of an axial pull, projections 11 behave as stops limiting the relative movement of the wires. Thus, it is managed to limit gaps 13 between adjacent wires 10 whose maximum width is known. This is particularly important at the point of support of the outside surface of the sealing sleeve or tube. Actually this limitation of the size of gaps 13 between wires 10 of armoring web 4 makes it possible to prevent deformations and creeping of said sleeve or said tube. At all points of the approximately cylindrical surface consisting of armoring web 4, the sealing sleeve or tube finds a support surface making it possible to absorb the internal pressure.

T-shaped wires 10 that can be interlocked are used. Each arm of the T comprises a groove 12 of width b followed by a projection 11 of width a. Adjacent wires 10 are inverted so that projections 11 of the preceding wires enter the groove of the following wire. Thus, the maximum size of gaps 13 between adjacent wires 10 of armoring web 4 is limited. Armoring web 4 thus comprises a first set of T-shaped wires 10 placed so that the foot of the T is oriented in the direction of the axis of the pipe and a 2nd set of T-shaped wires 10 placed so that the foot of the T is oriented outward in relation to the axis of the pipe; preferably, wires 10 of the first set all exhibit an identical section, and wires 10 of the second set also all exhibit an identical section, the sections of the wires constituting each of the two sets that can be respectively different, or identical as illustrated by FIG. 5.

In FIG. 6, a third example of embodiment of armoring web 4 of the flexible tubular pipes according to this invention can be seen. In the example of FIG. 6, two T-shaped wires 10 are joined by a U-shaped wire 10', just as two U-shaped wires 10' are joined by a T-shaped wire 10. U-shaped wires 10' comprise two projections 11' entering grooves 12 of T-shaped wires 10, and a groove 12' that makes it possible to receive two projections 11 of wires 10. In the example illustrated in FIG. 6, wires 10' are found on the interior side of the flexible tubular pipe.

The use of T-shaped wires 10 proves particularly advantageous for making armoring web 4.

In FIG. 7, a third example of embodiment of armoring web 4 can be seen consisting of a plurality of wires 10 of complementary shape. In the example of FIG. 7 two sets of U-shaped wires 10 mounted head to tail, i.e. projections 11 of two neighboring wires 10 of a first set 10 penetrate inside a groove of a wire 10 belonging to a second set of wires 10.

We will describe below an advantageous process for producing flexible tubular pipes according to this invention.

For the flexible tubular pipes of rough bore type, it is begun by producing an inside casing of interlocked strip.

Sealing sleeve 3 is extruded around the interlocked strip.

For making flexible tubular pipes of the smooth board type, the step for producing the interlocked strip is omitted.

It should be noted that the presence of such an interlocked strip is advantageous each time that it is important that the flexible tubular pipe be able to withstand crushing, or that the flexible pipe is intended to transport diphasic crude oil.

The winding of interlockable wires 10 belonging to web 4 is performed. During the winding, the effective interlocking of the wires in one another is assured.

The winding of the non-interlocked wires belonging to web 5 is performed. In the case of flexible tubular pipes 1, comprising more than two armoring webs, as for example pipes with 3 webs, not shown, pipes with 4 webs illustrated in FIG. 3 or comprising a higher number of webs, not shown, the winding of the successive webs is continued. After the winding of the last web, an outside sleeve is advantageously extruded.

It is possible to insert various webs such as protective sleeves or tapings or of optional thermal insulations between the armoring webs or between the inner sealing sleeve and the inner armoring web or else between the outer armoring web and the outer sleeve without going outside the scope of this invention.

Of course, the simultaneous continuous performing of at least two consecutive steps in producing the flexible tubular pipe does not go outside the scope of this invention. It is thus possible to perform simultaneously two or more steps with a linear shift in the length of the flexible tubular pipe being made causing the pipe to progress continuously through various machines used for performing the successive steps of production. In the example ordinarily used by the applicant company, an armor winding machine possessing two winding cages is used, which makes it possible to perform simultaneously:

the winding of a first interlocked armoring web 4, and the winding of a second non-interlocked armoring web 5; and optionally the laying of intermediate layers, by taping for example and in the same way.

As a function of the characteristics of the various webs constituting the armoring of the flexible pipe, other methods of production are possible. Thus, in the case, for example, of a flexible pipe of the type illustrated by FIG. 2 whose armoring consists of a first interlocked web wound with a high angle, that can exceed 70° for example, but that remains less than 80°, and of a second, non-interlocked armoring web wound with a relatively low angle, for example between 15° and 35°, it is possible to use, to make the first interlocked web, not an armor winding machine, but a machine such as a spiral winding machine of the type of those which are normally used to produce the pressure vaults with a very large spiral winding angle, 85° for example. Thus the flexible pipe described above by way of example, comprising a first interlocked web wound at 75° and a second non-interlocked web wound at 28°, can be produced, economically, by performing the placing of the armorings in two separate successive steps:

first step consisting in placing the interlocked armoring web with a spiral winding machine. It is possible to use all interlockable wires, for example Z-, T-, or U-shaped.

second step consisting of placing the second non-interlocked armoring web with an armor winding machine having a single cage.

We claim:

1. A flexible tubular pipe comprising an inner sealing sheath and a plurality of armoring webs surrounding said sheath and composed of a plurality of wires each wound with an angle less than 80° in relation to a central axis of said flexible tubular pipe, said winding angles of said wires of said armoring webs being set so as to obtain a balanced flexible tubular pipe, such that a first innermost armoring web of said plurality of armoring webs includes a plurality of interlockable wires, such that each other web of said plurality of armoring webs disposed outside of said first innermost armoring web comprises a plurality of non-interlockable wires, wherein said plurality of interlockable wires of said first armoring web are wound with an angle A1 and said plurality of non-interlockable wires of said each other armoring web are wound with an angle A2 wherein a tangent of A1 multiplied by a tangent of A2 falls within a range of 1.9 and 2.2, inclusive.

2. A flexible tubular conduit according to claim 1, wherein angles A1 and A2 are approximately equal.

\* \* \* \* \*